United States Patent Office 3,005,751
Patented Oct. 24, 1961

3,005,751
COMBATTING WOOD-BORING INSECTS WITH INSECTICIDES DISPERSED IN ISOPARAFFINIC HYDROCARBONS
Roy E. Stansbury, Bartlesville, Okla., assignor to Phillips Petroleum Company, a corporation of Delaware
No Drawing. Filed Feb. 3, 1959, Ser. No. 790,807
9 Claims. (Cl. 167—38.6)

This invention relates to the combat of the wood-boring insects. In one of its aspects, it relates to the impregnation of woods with insect combatting agents dispersed in an isoparaffinic hydrocarbon. In another of its aspects, the invention relates to the application to trees and shrubs, in order to protect the woods of the same, of a non-phytotoxic insecticide dispersed in an isoparaffinic solvent boiling in the range 350–600° F. In a further aspect of the invention, it relates to the impregnation of woods to protect the same against the ravages of wood-boring insects by impregnation of the wood with an insecticide dispersed in an isoparaffinic hydrocarbon fraction boiling in the range 350–600° F. and prepared by the alkylation of an isoparaffin with an olefin in the presence of an alkylation catalyst. In a further aspect of the invention, it relates to the protection of seasoned wood by application thereto of a sufficient amount of an insecticide dispersed in an isoparaffinic solvent boiling in the range 350–600° F. In a still further aspect of the invention, oak trees, elm trees, and other trees and woody shrubs are protected against wood borers by painting the same with a solution of a non-phytotoxic insecticide dispersed in an isoparaffinic hydrocarbon as described herein, which can boil in the approximate range 350–600° F., to obtain a desired depth penetration of the active ingredient in the wood.

Wood-boring insects cause millions of dollars of damage each year. Not only are home owners troubled with such wood-boring pests as termites but the loss of trees to other wood-boring insects amounts to many millions of dollars each year. Not only are the lumber industry, the forest reserves and others concerned with this problem, but home owners are also faced with the loss of many valuable and beautiful trees.

These wood-boring insects are extremely difficult to combat, since they are located at a considerable depth below the surface of the wood. If allowed to remain within the wood in an active, feeding condition, trees will quickly die, and lumber will be weakened to the point of collapse.

It has now been discovered that wood-boring insects located in the interior of wood, as in trees and shrubs, can be effectively combatted by applying to the surface of the wood a solution of a non-phytotoxic insecticide dissolved in an isoparaffinic hydrocarbon as herein described.

It is an object of this invention to combat wood-boring insects. It is a further object of this invention to provide a method for combatting insects which ravage wood and which can be found in the depths of the wood. It is a further object of this invention to impregnate wood with an active insecticide by dispersing the same in an insecticide adjuvant which is peculiarly suited to the deep penetration of the wood of trees and woody shrubs.

Other aspects, objects and the several advantages of this invention are apparent from a study of this disclosure and claims.

According to this invention, insects which ravage wood are effectively combatted by applying to the wood an insecticide dispersed in an isoparaffinic hydrocarbon boiling in the range 350–600° F.

The isoparaffinic hydrocarbons which are employed as solvents for the non-phytotoxic insecticides in the method of this invention boil between about 350° F. and about 600° F., and are conveniently prepared by the alkylation of isoparaffins with monoolefins using such catalysts as hydrogen fluoride, aluminum chloride, sulfuric acid and the like. Two particularly effective isoparaffinic hydrocarbon fractions are sold under the tradenames Soltrol–170 and Soltrol–180, Soltrol–170 being the most preferred solvent in the present invention. Soltrol–170 has a boiling range of about 421–445° F. and Soltrol–180 has a boiling range of 399–480° F.

The non-phytotoxic insecticides which are employed in solution in these isoparaffinic hydrocarbons are normally chlorine-containing insecticides, but any non-phytotoxic insecticides can be employed. The non-phytotoxic insecticides which are most useful are 1,2,3,4,10,10 - hexachloro - 1,4,4a,5,8,8a - hexahydro -1,4 endoexo-5,8-dimethanonaphthalene (Aldrin)
1,2,3,4,10,10 - hexachloro - 6,7 - epoxy - 1,4,4a,5,6,7,8, 8a - octahydro - 1,4 - endoexo - 5,8 - dimethanonaphthalene (Dieldrin)
the gamma isomer of 1,2,3,4,5,6-hexachlorocyclohexane (Lindane)
1,1,1-trichloro-2,2-bis(p-chlorophenyl)ethane (DDT).

Of these non-phytotoxic insecticides, Dieldrin is the most preferred. The amount of non-phytotoxic insecticides which will be dissolved in the isoparaffinic hydrocarbons previously described will be from 0.5 weight percent up to the maximum amount which is soluble in these hydrocarbons. The solubility of these non-phytotoxic insecticides in these isoparaffinic hydrocarbons is disclosed in Journal of Economic Entomology, 46, No. 6, page 988 (1953). For example, the solubility of Aldrin is 20 percent, Dieldrin 4.4 percent, DDT 5 percent and Lindane 2.1 percent, all values being given in weight percent.

The process of the present invention is based upon the discovery that the isoparaffinic hydrocarbons herein described have remarkable powers for penetrating wood. The solutions of non-phytotoxic insecticides in these isoparaffinic hydrocarbons can be sprayed directly on the surface of the bark of live trees and shrubs, and the solutions will penetrate this woody or cork layer, thus killing the wood-boring insects which are infesting the living layers of the three beneath the bark. In fact, the amazing penetrating power of these materials will effect a complete penetration of limbs even 2 or 3 inches in outside diameter. It can be easily seen that these solutions are also useful for combatting wood-boring insects in finished lumber or other items of wood. Penetration of finished lumber by these materials provides a means for killing termites and other wood-boring insects infesting the interior of the wood.

The following specific examples illustrate the advantages of the present invention.

EXAMPLE I

Five pin oak trees were noted to be "weeping," indicating that the trees were infested with borers. The woody sections of two of these trees were painted with a one percent by weight solution of Dieldrin in Soltrol–180. The woody sections of two other trees were painted with a one percent by weight solution of Aldrin in Soltrol–180, while one tree was not painted. The typical properties of Soltrol–180 are as follows:

*Typical properties*

Distillation range:
| | |
|---|---|
| Initial boiling point, °F | 399 |
| 10% evaporated, °F | 409 |
| 50% evaporated, °F | 419 |
| 70% evaporated, °F | 429 |
| 90% evaporated, °F | 450 |
| 95% evaporated, °F | 463 |
| End point, °F | 480 |
| Specific gravity at 60° F | .7809 |
| API gravity at 60° F | 49.7 |
| Refractive index at 20° C | 1.435 |
| Bromine number | 1.0 |
| Kauri-butanol value, ml | 26.0 |
| Aniline point, 9F | 186 |
| Flash point, TCC, °F., 760 mm | 164 |
| Unsulfonated residue, percent | 98.0 |
| Color, Saybolt | +30 |

After six days, the four treated trees had stopped "weeping" except two places on one of the trees which was painted with the Dieldrin solution. This tree was the most severely infested of the five. This particular tree was then washed with water, and the insecticide treatment was repeated. Eight days later, all signs of "weeping" on this tree had also cleared up. The untreated tree remained severely infested with borers.

EXAMPLE II

Several tests were run to determine the penetrating qualities of the isoparaffinic hydrocarbon of Example I. These tests were carried out in the following manner, and comparisons were made with two other hydrocarbons, Stoddard solvent and diesel fuel.

One-tenth gram of a red oil soluble pigment was dissolved in 100 milliliters of the solvent to be tested. Two milliliters of each solvent were then placed in each of three containers, and the ends of white pine boards were immersed in the solvents. One series of tests was carried out in this manner for 10 minutes, while in another test, the ends of the boards were immersed for three hours. The boards were then removed from the solvent, and let dry for 24 hours. The boards were then split endwise, and the penetration as indicated by the dye was measured. The penetrations were as follows:

*Penetration*

| Hydrocarbon: | Penetration in inches, 3 hour immersion |
|---|---|
| Isoparaffinic hydrocarbon (Soltrol–180) | 2¾ |
| Diesel fuel | 1 |
| Stoddard solvent | ½ |

EXAMPLE III

The woody portions of mature elm trees which were heavily infested with borers were sprayed with a 0.5 weight percent solution of Dieldrin in an isoparaffinic hydrocarbon fraction sold under the tradename of Soltrol–170. The typical properties of Soltrol–170 are as follows:

*Typical properties*

Distillation range:
| | |
|---|---|
| Initial boiling point, °F | 421 |
| 10% evaporated, °F | 425 |
| 20% evaporated, °F | 427 |
| 50% evaporated, °F | 429 |
| 70% evaporated, °F | 432 |
| 90% evaporated, °F | 436 |
| 95% evaporated, °F | 439 |
| End point, °F | 445 |
| Specific gravity at 60° F | 0.7728 |
| API gravity at 60° F | 51.7 |
| Bromine number | 0.6 |
| Kauri-butanol value, ml | 23.2 |
| Aniline point, °F | 196.9 |
| Flash point, TCC, °F., 760 mm | 185 |
| Unsulfonated residue, percent | 98.5 |
| Color, Saybolt | +26 |

The application of this material to the borer-infested elm trees provided complete control of these insects. No leaf drop or other damage to the trees was noted.

The process of this invention has also been used to control borers in locust trees, tip borers and bark beetles in pine trees, and shot hole borers in apple and other fruit trees. Shrub borers such as lilac borers and photinia borers have also been controlled effectively by utilizing the process of this invention.

The process of this invention has also been used to control wood-boring insects in seasoned wood. Termite-infested floor joists of a frame house were sprayed with a solution of Dieldrin in Soltrol 170. The termites were effectively controlled by this treatment.

Reasonable variation and modification are possible within the scope of the foregoing disclosure and the appended claims to the invention, the essence of which is that isoparaffinic hydrocarbons, particularly as described herein and as prepared by alkylation of isoparaffins with olefins in the presence of a catalyst, have been found remarkably effective in the impregnation of woods to protect the same against ravages of insects, such as wood-boring insects.

I claim:

1. A method of protecting seasoned wood against the ravages of wood-destroying insects which comprises impregnating the wood with an insecticide dispersed in an isoparaffinic hydrocarbon boiling in the range 350–600° F.

2. A method of protecting wood which is subject to internal attack by insects against said insects which may otherwise enter the same which comprises distributing within the wood and insect combatting agent effective against wood-boring insects by dispersing said agent into an isoparaffinic hydrocarbon boiling in the range 350–600° F., said hydrocarbons being a mixture of hydrocarbons obtained upon alkylation of an isoparaffin with an olefin in the presence of an HF catalyst, and applying the dispersion thus obtained to the wood in a quantity and for a time sufficient to obtain penetration of the agent to said wood a substantial distance and to impregnate said wood with an effective amount of insecticide.

3. A method of protecting wood which is subject to internal attack by insects against said insects which may otherwise enter the same which comprises distributing within the wood an insect combatting agent effective against wood-boring insects by dispersing said agent into an isoparaffinic hydrocarbon boiling in the range 350–600° F., said hydrocarbon being a mixture of hydrocarbons obtained upon alkylation of an isoparaffin with an olefin in the presence of an aluminum chloride alkylation catalyst, and applying the dispersion thus obtained to the wood in a quantity and for a time sufficient to obtain a penetration of the agent to said wood a substantial distance and to impregnate said wood with an effective amount of insecticide.

4. A method of protecting wood which is subject to internal attack by insects against said insects which may otherwise enter the same which comprises distributing within the wood an insect combatting agent effective against wood-boring insects by dispersing said agent into an isoparaffinic hydrocarbon boiling in the range 350–600° F., said hydrocarbon being a mixture of hydrocarbons obtained upon alkylation of an isoparaffin with an olefin in the presence of a sulfuric acid alkylation catalyst, and applying the dispersion thus obtained to the wood in a quantity and for a time sufficient to obtain a penetration of the agent to said wood a substantial distance and to impregnate said wood with an effective amount of insecticide.

5. A method of protecting live trees and woody shrubs which are subject to attack by wood-boring insects against said wood-boring insects, without damage to said trees or shrubs, which comprises impregnating the wood with an insecticide effective against said insects dispersed in an isoparaffinic hydrocarbon boiling in the range 350–600° F., the dispersion being applied to the wood in a quantity sufficient to penetrate said wood a substantial distance and to impregnate said wood with an effective amount of said insecticide.

6. A method of combatting wood-boring insects in a wood which is subject to attack by said insects which comprises impregnating said wood with a non-phytotoxic insecticide effective against wood-boring insects, said insecticide being dispersed in an isoparaffinic hydrocarbon boiling in the approximate range 350–600° F., the dispersion being applied to the wood in a quantity sufficient to penetrate said wood a substantial distance and to impregnate said wood with an effective amount of said insecticide.

7. A method of combatting wood-boring insects in a wood which is subject to attack by said insects which comprises applying to said wood a non-phytotoxic insecticide effective against wood-boring insects, said insecticide being dispersed in an isoparaffinic hydrocarbon boiling in the approximate range 350–600° F., the dispersion being applied to the wood in a quantity sufficient to penetrate said wood to a substantial distance and to impregnate said wood with an effective amount of said insecticide.

8. A method of combatting wood-boring insects in a wood which is subject to attack by insects which comprises spraying directly onto said wood a non-phytotoxic insecticide effective against wood-boring insects dispersed in an isoparaffinic hydrocarbon boiling in the approximate range 350–600° F., the dispersion being applied to the wood in a quantity sufficient to penetrate said wood a substantial distance and to impregnate said wood with an effective amount of said insecticide.

9. A method of combatting wood-boring insects into a wood which is subject to attack by said insects which comprises applying directly to said wood a non-phytotoxic insecticide effective against wood-boring insects dispersed in an isoparaffinic hydrocarbon boiling in the approximate range 350–600° F., the dispersion being applied to the wood in a quantity sufficient to penetrate said wood a substantial distance and to impregnate said wood with an effective amount of said insecticide.

References Cited in the file of this patent

UNITED STATES PATENTS

| | | |
|---|---|---|
| 2,502,366 | Beman | Mar. 28, 1950 |
| 2,543,955 | Boyd | Mar. 6, 1951 |
| 2,704,246 | Goodhue | Mar. 15, 1955 |
| 2,757,121 | Fahlstrom | July 31, 1956 |

OTHER REFERENCES

Journal of Economic Entomology, vol. 46, No. 6, pp. 986, 988 (1953).